Patented Sept. 3, 1940

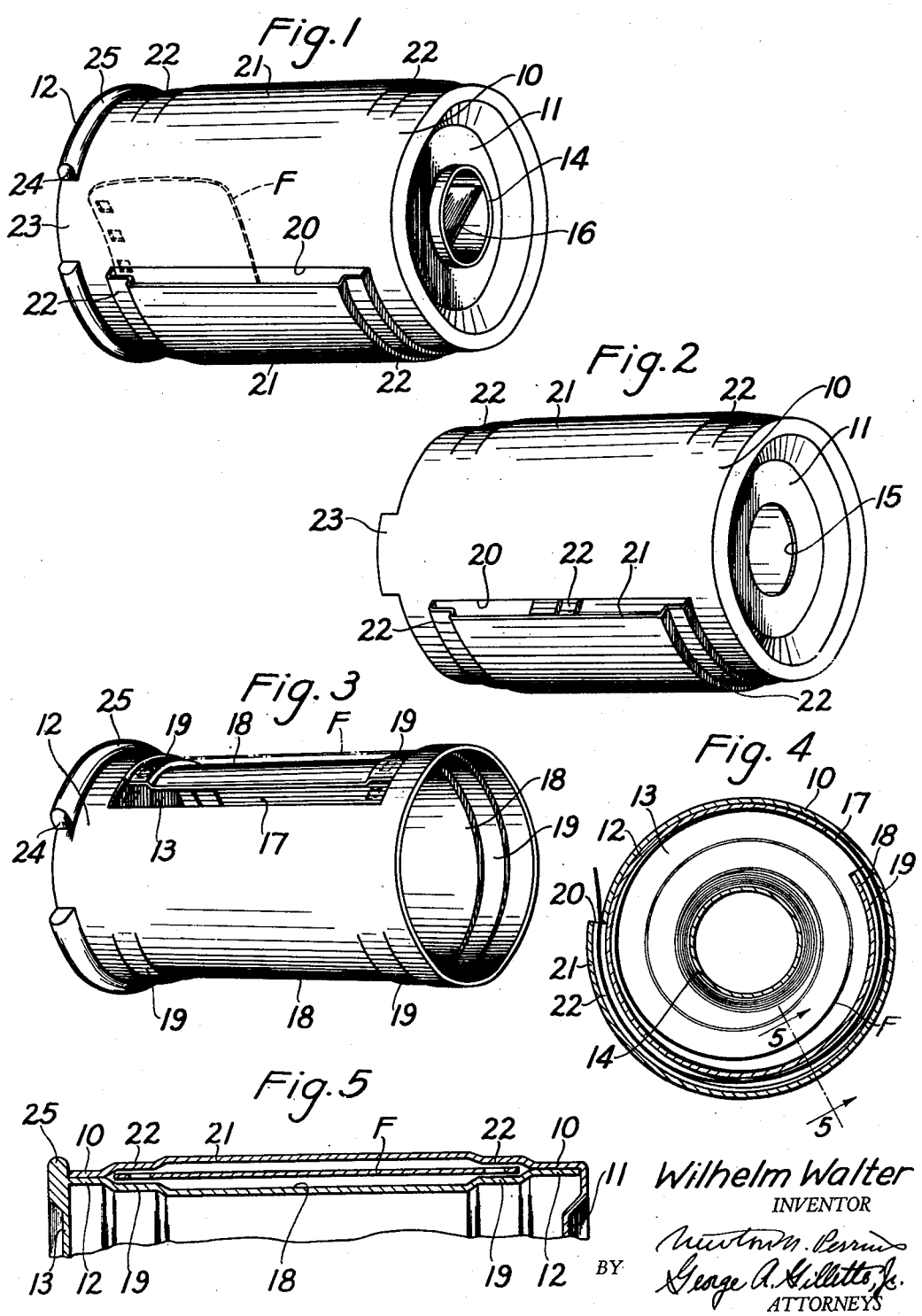

2,213,776

UNITED STATES PATENT OFFICE 2,213,776

FILM CONTAINER

Wilhelm Walter, Stuttgart, Germany, assignor to Eastman Kodak Company, Rochester, N. Y., a corporation of New Jersey Application December 8, 1938, Serial No. 244,639
In Germany May 28, 1938

3 Claims. (Cl. 242—71)

The present invention relates to a film container and more particularly to a tubular container for a spool or coil of photographic film which is withdrawn from the container and subsequently rewound thereinto during a photographic operation.

Film containers of the same general type are very well known but are quite universally provided with linings of light-sealing material, such as plush, in the film passages or exits. While such light-sealing linings provide effective light locks to prevent fogging of the film within the container, they are open to the objection that dirt and dust particles are collected by the light-sealing lining and thereafter scratch or abrade the film. This difficulty is particularly present when the prior art film containers with plush lined film passages are reloaded so that substantial areas of film pass through the film guideway.

The primary object of the present invention is the provision of a film container having a film passage without a lining of light-sealing material but which on account of its curvature and length provides an effective light seal for the container.

Another object of the invention is the provision of a film container composed of telescoping tubular casings and having one or more channels around the periphery of such casings to provide an arcuate light sealing film passage.

A further object of the invention is the provision of a pair of telescoping tubular members provided with peripheral channels and with a connection between the members so that the channels are maintained in a definite relative relation when the tubular casing members are fully telescoped.

Other and further objects of the invention will be apparent to those skilled in the art from the description which follows.

The above and other objects of the invention are attained by the provision of a film container comprising a pair of tubular casing members adapted to be telescoped to form a closed container for a spool or coil of photographic film, said members each being provided with openings which are angularly displaced with respect to each other when the casing members are telescoped, and an arcuate film passage extending from one opening to the other and formed by permanently channeling at least one of said tubular casing members. In the preferred form of the invention, both of the tubular casing members are deformed to provide channels of progressively varying depth and which co-operate with each other to form a film passage of substantially constant depth and extending from one film opening to the other.

Reference is hereby made to the accompanying drawing wherein similar reference characters designate similar elements and wherein:

Fig. 1 is a perspective view of the film container with its respective casing members in telescoped position.

Fig. 2 is a perspective view of the outer tubular casing member.

Fig. 3 is a perspective view of the inner tubular casing member.

Fig. 4 is a transverse cross section through the assembled or telescoped casing members; and Fig. 5 is a fragmentary, longitudinal cross section through the telescoped casing members and taken on the line 5—5 of Fig. 4.

In the illustrated embodiment of the invention, the film container comprises an outer tubular casing member 10 having an end wall 11 and an inner tubular casing member 12 having an end wall 13. The photographic film F is preferably supplied upon a conventional type of spool having a hub 14 which is journaled in openings, such as the opening 15 in end wall 11, of the respective end walls. A clutch member 16 may be inserted into said hub 14 for rewinding of the film into the container in a known manner. Although the sensitized photographic film F has been illustrated as being wound upon the conventional type of spool, it is to be understood that the film may be loosely coiled within the container which then has closed end walls. Either form of providing the film supply does not change the effectiveness or advantages of the present invention.

The inner tubular casing member 12 is provided with an opening 17 through which the film F, indicated by the dot-dash lines of Fig. 3, may extend. Said casing member 12 is also inwardly formed to provide a channel 18 which extends substantially around the periphery of said casing member 12. Said channel 18 is of progressively diminishing depth extending from the opening 17 around the casing 12 for a purpose later to be described. The channel 18 has marginal film-engaging portions 19 also extending around casing 12 with diminishing depth and for engaging the perforated margins of the film F to prevent scratching or abrasion of the central or picture areas of the film F.

On the other hand, the outer tubular casing member 10 is provided in its periphery with a film opening or film exit 20 through which the film F may be withdrawn to the exterior of the film container, see Figs. 1 and 4. A channel 21 also of progressively diminishing depth is formed in the periphery of casing member 10 and diminishes in depth in the direction away from film exit 20. Marginal film-engaging portions 22 also extend along the edges of channel 20 and correspondingly change in depth as the depth of the channel is varied.

The tubular casing members 10 and 12 may be telescoped to form a closed container for the spool or coil of sensitized film therein. According to the invention the opening 17 in casing member 12 is angularly displaced from the film exit 20 in casing member 10 when said casing members are telescoped and said opening 17 is preferably displaced from film exit 20 more than 180° in a clockwise direction, see Fig. 4, or along the path for the intervening film strip F. In order to insure such relative location of said opening 17 and film exit 20, a connection is provided between said casing members 10 and 12 and is arranged so as to be operative only when the casing members are completely telescoped and then to hold the casing members with their respective openings in desired positions of angular displacement. Such a connection may comprise a tongue 23 extending from the end of the outer casing member 10 and engaging with a notch 24 provided in an annular rim 25 on inner casing member 12.

It will now be understood that the channels 18 and 21 in the respective casing members 12 and 10 co-operate to form an arcuate closed film passage extending from opening 17 around the periphery of the film container to the film exit 20 in the outer casing member 10. It will also be understood that the unchanneled portions of casing members 10 and 12 are in surface engagement and prevent any short-circuiting or direct light fog from film exit 20 to the opening 17 in the direction opposite to that in which the film passage extends. The film passage, as before mentioned, preferably extends for more than 180° around the periphery of the film container, but its angular extent may be varied in relation to the light-sealing contact required between the undeformed surfaces of the casing members to obtain the optimum non-fogging results. It will also be understood that the channel 18 has its greatest depth opposite the least depth of the channel 21 and also that said channel 21 in the outer casing member 10 has its greatest depth opposite the least depth of the channel 18 in the inner casing member 12. The progressively diminishing depths of said channels 18 and 21 are preferably selected so that the resulting film passage will have a substantially constant depth.

It is now quite obvious that the film F may be freely withdrawn or rewound through the film passage formed by the channels 18 and 21. Such resultant channel has such a curvature and such an extent that light entering the film exit 20 is internally reflected and completely dissipated before reaching the interior of the film container. Such light sealing of the film container without the use of plush or similar material avoids the disadvantage of collecting dust or dirt on such light-sealing material with subsequent abrasion or scratching of the film. Consequently, a film container has been provided which is not only simple and rugged in construction but which may be used again and again without excessive scratching of the film because of the absence of any light-sealing material in the film passage which is rendered light sealing, according to the invention, by its length and curvature.

Several modifications or variations of the present invention are possible without departing from the scope of the invention which is defined in the claims which follow.

Having now particularly described my invention what I desire to secure by Letters Patent of the United States and what I claim is:

1. A film container comprising a pair of tubular casing members having end walls and adapted to be telescoped one into the other to form a closed container for a spool of sensitized film, the inner casing member being provided with an opening and with an inwardly formed channel which extends from said opening around the periphery of said member and which is of progressively diminishing depth, and the outer casing member being provided with a film exit and with an outwardly formed channel of progressively diminishing depth extending away from said film exit, said opening and film exit being displaced with respect to each other when said casing members are telescoped and said channels being arranged to form a film passage of substantially constant depth from said opening to said film exit.

2. A film container comprising a pair of tubular casing members having end walls and adapted to be telescoped one into the other to form a closed container for a spool or coil of sensitized film, the inner casing member being provided with an opening and with an inwardly formed channel which extends from said opening around the periphery of said member and which is of progressively diminishing depth, the outer casing member being provided with a film exit and with an outwardly formed channel of progressively diminishing depth extending away from said film exit, and a connection between said casing members and operative only when said casing members are telescoped with the respective openings therein displaced with respect to each other and with the respective channels therein forming an arcuate light sealing passage for a film strip.

3. A film container comprising a pair of tubular casing members having end walls and adapted to be telescoped one into the other to form a closed container for a spool of sensitized film, the inner casing member being provided with an opening and with an inwardly formed channel which extends from said opening partially around the periphery of said member and which is of progressively diminishing depth, and the outer casing member being provided with a film exit and with an outwardly formed channel which extends from said film exit partially around the periphery of said member and which is of progressively diminishing depth extending away from said film exit, said opening and film exit being displaced with respect to each other when said casing members are telescoped, said channels being substantially co-extensive to form a film passage from said opening to said film exit, and the unformed portions of said casing members engaging each other to form a light seal around the remainder of the periphery of said container.

WILHELM WALTER.